(12) United States Patent
Groos et al.

(10) Patent No.: US 8,700,793 B2
(45) Date of Patent: Apr. 15, 2014

(54) METHOD, APPARATUS AND COMPUTER PROGRAM PRODUCT FOR SERVICE DECOMPOSITION IN IP-BROADCAST NETWORKS

(75) Inventors: Gerd Groos, München (DE); Ivan Kopilovic, München (DE); Peter Siebert, Uster (CH); Marcel Wagner, München (DE)

(73) Assignee: Nokia Siemens Networks OY, Espoo (FI)

( * ) Notice: Subject to any disclaimer, the term of this patent is extended or adjusted under 35 U.S.C. 154(b) by 108 days.

(21) Appl. No.: 12/739,200

(22) PCT Filed: Oct. 21, 2008
(Under 37 CFR 1.47)

(86) PCT No.: PCT/EP2008/064192
§ 371 (c)(1),
(2), (4) Date: May 4, 2011

(87) PCT Pub. No.: WO2009/053351
PCT Pub. Date: Apr. 30, 2009

(65) Prior Publication Data
US 2012/0047278 A1 Feb. 23, 2012

(30) Foreign Application Priority Data
Oct. 22, 2007 (EP) .................................. 07020645

(51) Int. Cl.
*G06F 15/16* (2006.01)
*G06F 15/173* (2006.01)

(52) U.S. Cl.
USPC .......................................... 709/231; 709/241

(58) Field of Classification Search
USPC ................................................. 709/231, 241
See application file for complete search history.

(56) References Cited

U.S. PATENT DOCUMENTS 7,561,582 B2   7/2009 Ohta et al.
7,720,958 B2 * 5/2010 Mills et al. .................... 709/224
(Continued)

FOREIGN PATENT DOCUMENTS

CN   1581868 A   2/2005
CN   1906909 A   1/2007
(Continued)

OTHER PUBLICATIONS

Jeffrey Kang, et al.: "Adaptive Streaming of Combined Audio/Video Content Over Wireless Networks", Autonomic Management of Mobile Mulitmedia Sevices Lecture Notes in Computer Science; LNCS, Springer Berlin Heidelberg, BE, vol. 4267, Jan. 1, 2006, pp. 13-24, XP019047345, ISBN: 978-3-540-47654-2, p. 16-17.

*Primary Examiner* — Minh-Chau Nguyen
(74) *Attorney, Agent, or Firm* — Laurence A. Greenberg; Werner H. Stemer; Ralph E. Locher

(57) ABSTRACT

In a method, an apparatus and a computer program product for service decomposition in IP-broadcast networks, a full service bundle is detected within a first transport stream protocol having a plurality of broadcast packets corresponding to respective broadcast services. The respective service identifiers of the plurality of broadcast packets are evaluated, and the full service bundle is decomposed to create a plurality of decomposed broadcast packets on the basis of the service identifiers. For at least one same service identifier the corresponding plurality of decomposed broadcast packets is sent with the first transport stream protocol as a main service bundle, and for at least one remaining same service identifier the corresponding plurality of decomposed broadcast packets is sent with a second transport stream protocol as a sub service bundle. The second transport stream protocol contains synchronization information of the first transport stream protocol.

25 Claims, 4 Drawing Sheets

(56) References Cited

U.S. PATENT DOCUMENTS

| | | |
|---|---|---|
| 7,782,846 B2 | 8/2010 | Kato et al. |
| 7,849,130 B2 * | 12/2010 | Albaugh et al. .............. 709/203 |
| 8,195,850 B2 | 6/2012 | Wang et al. |
| 2003/0169368 A1 * | 9/2003 | Hamada et al. ............... 348/465 |
| 2005/0005025 A1 * | 1/2005 | Harville et al. ............... 709/241 |
| 2007/0165676 A1 | 7/2007 | Kato |
| 2007/0220577 A1 | 9/2007 | Kongalath |
| 2008/0086564 A1 * | 4/2008 | Putman et al. ................ 709/227 |

FOREIGN PATENT DOCUMENTS

| | | |
|---|---|---|
| CN | 1926872 A | 3/2007 |
| EP | 0917355 A1 | 5/1999 |
| EP | 1801781 A1 | 6/2007 |
| WO | 2007105093 A1 | 9/2007 |

* cited by examiner

MP2T: TS-packet modified RTP3: T-packet timestamp ≙ PCR

METHOD, APPARATUS AND COMPUTER PROGRAM PRODUCT FOR SERVICE DECOMPOSITION IN IP-BROADCAST NETWORKS

BACKGROUND OF THE INVENTION

Field of the Invention

The present invention relates generally to a method, an apparatus and a computer program product for service decomposition in IP-broadcast networks and, more particularly, to a method, an apparatus and a computer program product for service decomposition in an IP-multi-cast-capable system for efficient bandwidths usage when delivering TV over MPEG2-transport streams and Real Time Protocol-transport streams.

In traditional non-interactive broadcast networks or broadcast systems, the available services are usually provided in a bundle of service components, e.g. video data, audio (stereo)-data, audio (5.1)-data, teletext-data and subtitles. This is necessary in order to allow the highest possible scalability, i.e. the data or services are broadcasted to everyone, and the receiver decides which service components to select.

This is currently the best practice also in interactive multimedia delivery over IP-broadcast networks (e.g. fixed/wireless access networks), i.e. the broadcast paradigm has been applied to IP based delivery scenarios, even when not all service components are relevant to the receiver.

Unlike traditional broadcast systems, the data rate available for a media delivery over the last mile (both in fixed or wireless networks) may be non-predictable and varies over time and reach (with the distance of the end user to the fixed/mobile access point). Therefore, assuming traditional broadcast delivery, the multimedia bundle has to be limited to the assumed worst case throughput. This, however, limits the richness and attractiveness of a service bundle (e.g. number of available languages etc.) uniformly for all users, although some users could receive more service components having higher bandwidths than others. This limitation is inherent in the broadcast paradigm, i.e. that the same service bundle must reach every receiver.

Thus, in the past, the service bundle broadcasted to the public was limited by the assumed worst case access link bandwidth (i.e. a bandwidth that can be assumed with a certain probability). This limitation aims to "guarantee" media delivery for the whole addressed subscriber base.

Therefore, one work-around is to deliver several service bundles with different bandwidth requirements over the core and aggregation network concurrently, and to implement a selection mechanism in the respective receivers choosing the bundle that fits best into the available bandwidth of the given fixed/mobile access.

The disadvantage of this conventional solution is a waste of bandwidth in the core and aggregation network, since the same e.g. video and audio data are sent as part of several bundles. This limits the number of possible channels in the core and aggregation network. Moreover, in case all possible service combinations shall be provided by a network, this would lead to an overwhelming amount of respective broadcast bundles.

Another conventional approach is to send all bundle elements independently of each other. However, this concept is not supported by the predominant broadcast transport protocols, e.g. the MPEG2-transport stream (MP2T). Thus, this creates synchronization problems on the end-user side. Moreover, this approach would not be backward compatible with legacy devices.

Finally, a conventional approach could be to use a completely different transport protocol, i.e. the Real Time transport Protocol (RTP). It is, however, currently not possible to map the whole existing broadcast system with all functionalities to this existing Real Time transport Protocol (RTP). Moreover, this approach would also lack backward compatibility with legacy systems, which is very important in broadcast scenarios.

BRIEF SUMMARY OF THE INVENTION

It is, therefore, a need in the art to provide a method, an apparatus and a computer program product for service decomposition in IP-broadcast networks which enables an efficient bandwidth usage.

According to an embodiment of the present invention there is provided a method for service decomposition in IP-broadcast networks comprising the steps: detecting a full service bundle within a first transport stream protocol, comprising a plurality of broadcast packets corresponding to respective broadcast services; evaluating respective service identifiers of said plurality of broadcast packets; decomposing said full service bundle to create a plurality of decomposed broadcast packets on the basis of said service identifiers; sending for at least one same service identifier the corresponding plurality of decomposed broadcast packets with said first transport stream protocol as a main service bundle; and sending for at least one remaining same service identifiers the corresponding plurality of decomposed broadcast packets with a second transport stream protocol as a sub service bundle, wherein said second transport stream protocol comprises synchronization information of said first transport stream protocol.

According to a further embodiment of the present invention there is provided an apparatus for a service decomposition in IP-broadcast networks comprising: detection means for detecting a full service bundle within a first transport stream protocol comprising a plurality of broadcast packets corresponding to respective broadcast services; evaluation means for evaluating respective service identifiers of said plurality of broadcast packets; decomposition means for decomposing said full service bundle to create a plurality of decomposed broadcast packets on the basis of said service identifiers; first sending means for sending for at least one same service identifier the corresponding plurality of decomposed broadcast packets with said first transport stream protocol as a main service bundle; and second sending means for sending for at least one remaining same service identifier the corresponding decomposed broadcast packets with a second transport stream protocol as a sub service bundle, wherein said second transport stream protocol comprises synchronization information of said first transport stream protocol.

Moreover, according to the present invention there is provided a computer program product for performing the above-mentioned method steps.

According to the present invention the decomposing of a full service bundle and the sending of a main service bundle may be realized by merely removing respective undesired broadcast packets out of the first transport stream protocol in accordance with said service identifier. Thus, if a main service bundle includes only a video service and an audio service in the predominant language a respective main service bundle can be created very easily by removing all broadcast packets which do not fulfill these requirements.

According to the present invention the first transport stream protocol may be a MPEG-2 transport stream protocol and the second transport stream protocol may be a modified real time transport protocol. Since the MPEG-2 transport stream protocol is a predominant transport protocol in broadcast and the real time transport protocol is predominant in conversational and mobile applications the resulting service bundles are easily to implement and backwards compatible.

According to the present invention the real time transport protocol may be modified in such a way that the transport packet comprises a signaling byte containing information about whether the RTP-packet contains the start or end information of a PES-packet, wherein the synchronization information is located in the time stamp of the RTP-header. Since this modified real time transport protocol uses a definition of the start and end of a packetized elementary stream a synchronization of a service sent in the first transport stream protocol with a service sent in a second transport stream protocol can be realized very easily on a PES-level.

According to an alternative embodiment of the present invention a transport packet of the modified real time transport protocol comprises an RTP-header-extension, wherein said synchronization information is located in the RTP-header-extension. This alternative embodiment allows to use "real" RTP-packets which are standard compliant to RTP-payload formats. The corresponding timing information is transmitted via the RTP-header-extension to the receiver. This has the advantage that the extension can be ignored by other receivers which do only play out RTP-compliant streams. This further improves the acceptability of the new method.

According to a further embodiment of the present invention a transport packet of the modified real time transport protocol comprises only an RTP-Header and a plurality of broadcast packets with the same packet identifier, wherein the synchronization information is located in the time stamp of the RTP-header. Since this modified real time transport protocol uses only the broadcast packets of a same service identifier independently whether the packetized elementary stream is complete or not, a further simplification can be achieved.

The foregoing has outlined rather broadly the features and technical advantages of embodiments of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

For a more complete understanding of the present invention and the advantages thereof, reference is now made to the following description taken in conjunction with the accompanying drawings, in which:

DESCRIPTION OF THE INVENTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific way to make and use the invention, and do not limit the scope of the invention.

The present invention will be described with respect to preferred embodiments in a specific context namely optimized service decomposition networks capable to realize IP-multi-cast technology by using the MPEG-2 transport stream protocol (MP2T) and the real time transport protocol (RTP). The invention may also be applied, however, to other protocols in IP-broadcast networks where an efficient bandwidth usage is necessary when delivering TV over fixed or mobile access technology.

Figure 1:
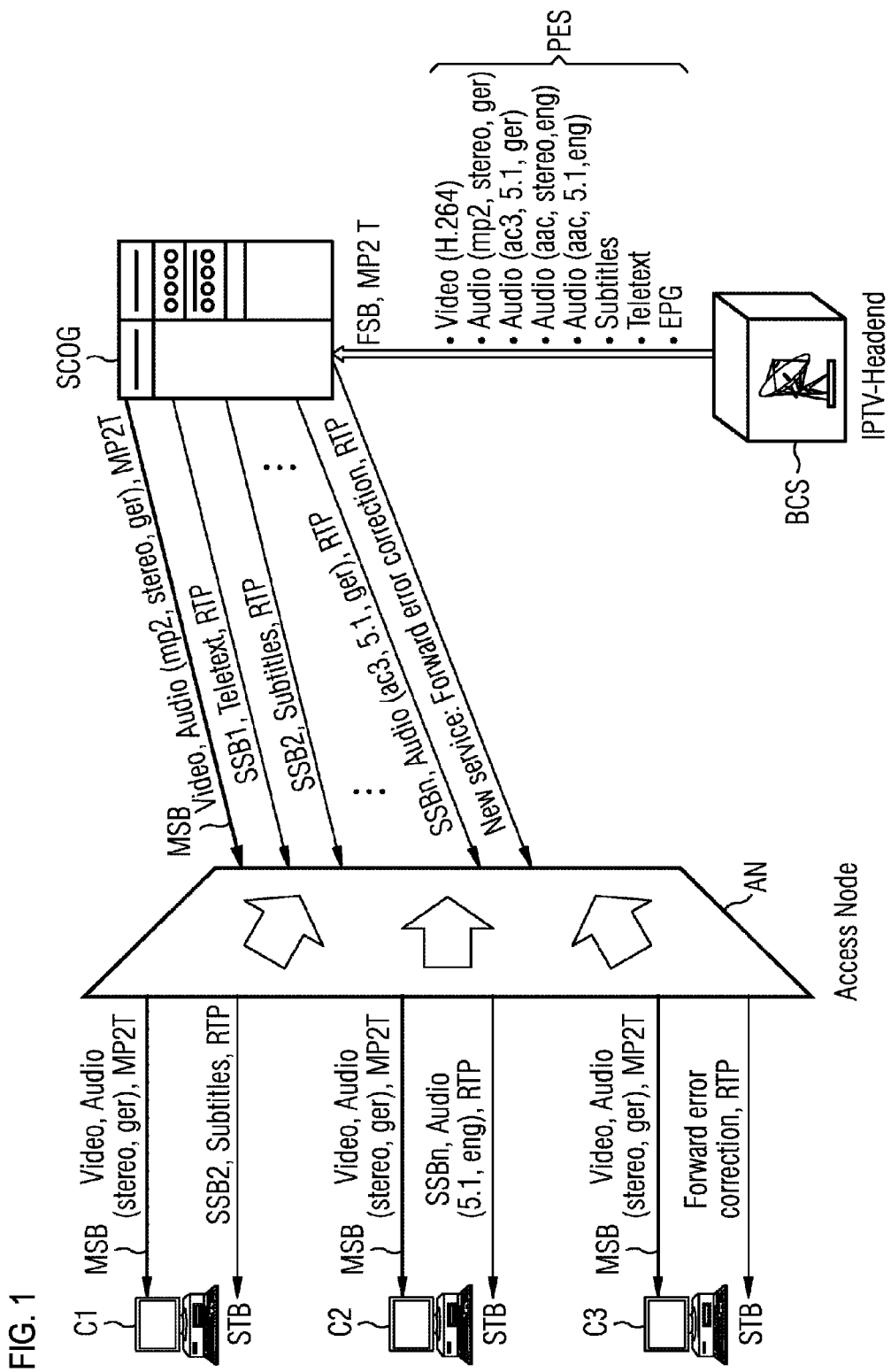
FIG. 1 illustrates a simplified block diagram of an IP-broadcast scenario.

FIG. 1 illustrates a simplified block diagram of a typical scenario for implementing the present invention. According to FIG. 1 an IP-multi-cast capable telecommunications network is used in order to realize a service decomposition for efficient bandwidth usage. The IP-network may be a fixed network, a mobile network or any other network, i.e. combinations of fixed and wireless networks.

According to FIG. 1 a broadcast source BCS, e.g. an IPTV-Headend, may provide a full service bundle FSB within a first transport stream protocol, such as MPEG-2 transport stream protocol (MP2T). The full service bundle FSB may comprise services such as a video service according to H.264, an audio service according to (MP2, stereo, ger), i.e. in German language, an audio service according to (ac3, 5.1, ger), an audio service according to (aac, stereo, eng), i.e. in English language, an audio service according to (aac, 5.1, eng), a subtitle service, a teletext service as well as an EPG service (Electronic Program Guide).

Thus, a broadcast service FSB with video, teletext, subtitles and different audio streams (with variations in language, audio codec, and a number of channels) is sent as a broadcast bundle via the traditional transport stream MP2T. A SCOG (Service (de)COmposition Gateway) decomposes the received full service bundle FSB into a main service bundle MSB (MP2T trunk) and a plurality of separate subservice bundles SSB (RTP streams) which are provided at an access node AN of the telecommunications network. The access node AN may be a mobile access node or a fixed access node. The main service bundle MSB and the plurality of separated subservice bundles SSB1 to SSBn including respective video, teletext, subtitles or audio services can thus be selectively requested by any receiver C1 to C3 of the network.

According to FIG. 1 the receiver C1 to C3 may constitute a set top box STB for home entertainment applications. However, a receiver may constitute any termination point within the network such as mobile or fixed terminals. Thus, according to the present invention it is possible that each receiver C1 to C3 merely receives the specific services, e.g. only subtitles SSB2 together with the main service bundle MSB for receiver C1 or an English audio service SSBn together with the main service bundle MSB for the receiver C2 or a forward error correction service together with the main service bundle MSB for the receiver C3. A waste of bandwidth particularly for the "last mile", i.e. the connection between the access node AN to the receivers C1 to C3 is, thus, prohibited. Moreover, all advantages of a broadcast controlled environment are still applicable, such as the modeling of the receiver, i.e. a set top box STB, by the broadcast source, an easy synchronization of the main service bundle MSB with the subservice bundle SSB, a scalability of the system etc. Thus, the broadcast paradigm requesting that all information comes from the broadcast source BCS is not violated while bandwidth problems within an IP based network are reduced. Finally, legacy receivers, such as old fashioned set top boxes STB can still be used at least for the main service bundle MSB without any problems.

Figure 2:
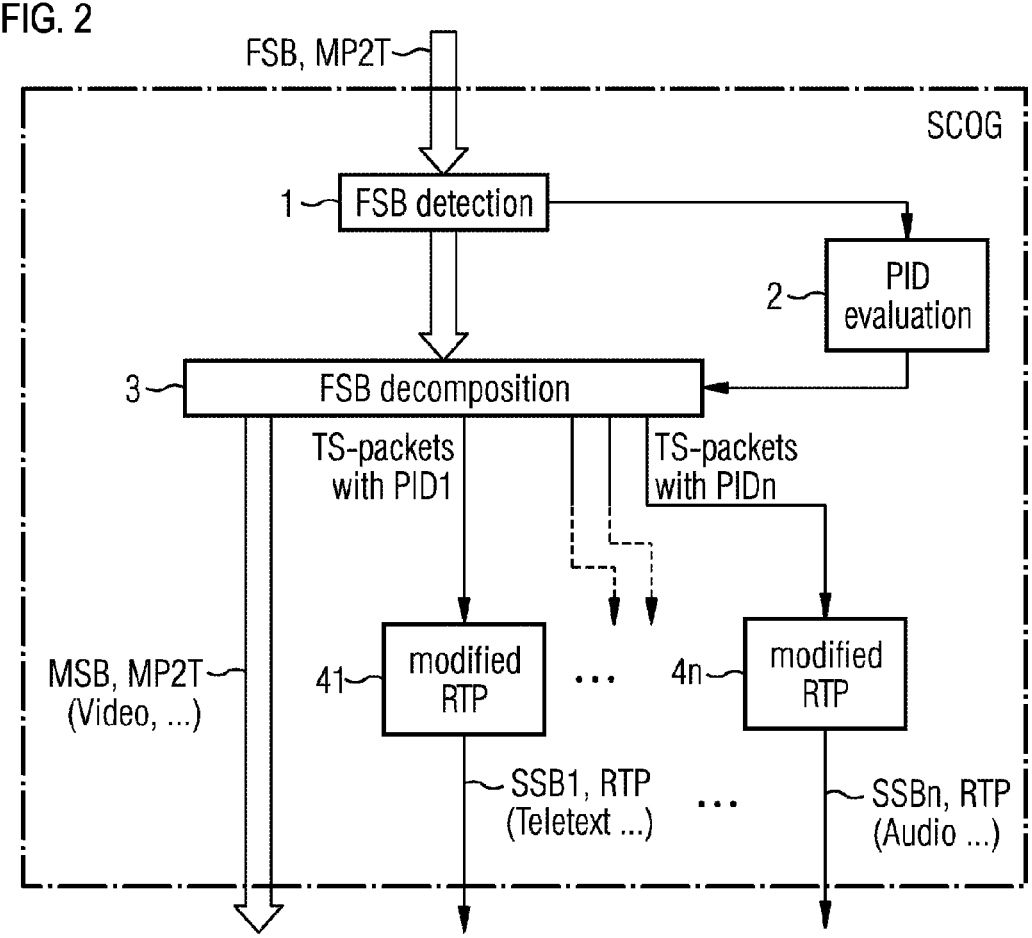
FIG. 2 illustrates a simplified block diagram of a service decomposition apparatus in accordance with an embodiment of the present invention.

FIG. 2 illustrates a simplified block diagram of an apparatus for service decomposition in IP-broadcast networks according to an embodiment of the present invention. According to FIG. 2 the apparatus constitutes a service (de)composition gateway SCOG as it may be used in FIG. 1.

According to FIG. 2 a full service bundle including the above mentioned video, audio, subtitle, teletext, EPG etc. services may be received within an MPEG-2 transport stream protocol (MP2T), which is the predominant transport protocol in broadcast systems.

Figure 3:
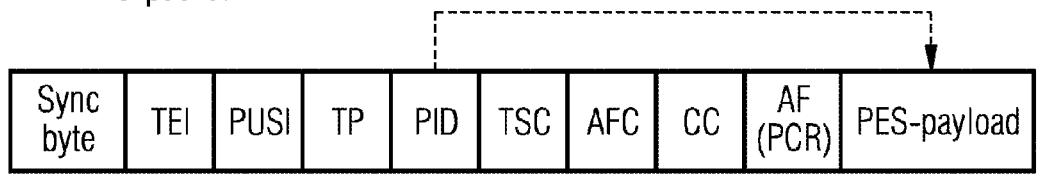
FIG. 3 illustrates a simplified frame structure of a transport stream packet in MPEG-2.

FIG. 3 illustrates a simplified frame structure of a respective broadcast packet, e.g. transport stream packet (TS-packet) of this MP2T protocol. In detail this broadcast packet includes a "sync byte" for a synchronization followed by the transport error indicator information TEI. A payload unit start indicator PUSI indicates whether a PES-header follows or not. A transport priority information TP signals transport priority within one packetized elementary stream PES. A service identifier, e.g. packet identifier information PID identifies whether the service transmitted by the PES-payload constitutes audio, video, subtitles, etc. A transport scrambling control information TSC signalizes whether scrambling is active or not. Moreover, the TS-packet of MP2T includes an adaptation field control AFC, a continuity counter CC with a sequence number as well as an adaptation field AF which contains the reference time, i.e. a program clock reference PCR, if present. Finally, the TS-packet includes the PES-payload for the respective packetized elementary streams PES transmitted within this frame.

According to FIG. 3 the service identifier, e.g. packet identifier PID refers to the PES-payload and identifies the respective service transmitted in a respective broadcast packet, e.g. transport stream packet (TS-packet) constituting the basis for the packetized elementary stream PES.

Coming back again to FIG. 2 the SCOG comprises a FSB detection means 1, which detects the full service bundle FSB transmitted by the broadcast source BCS, i.e. the IPTV-Headend. In detail, according to the specific embodiment wherein an MP2T protocol is used the detection means detects the broadcast packet, e.g. transport stream packet (TS-packet) according to FIG. 3 including at least a PES-payload with the respective audio, video and other services as well as a respective service or packet identifier PID.

Moreover, evaluation means 2 evaluates a respective service identifier, i.e. a packet identifier PID which refers to a respective PES-payload. Thus, the evaluation means evaluates the different services which are included in the incoming full service bundle FSB by their respective service identifiers PID.

Moreover, a decomposition means 3 decomposes the incoming full service bundle FSB to create a plurality of decomposed broadcast packets on the basis of the service identifiers, i.e. packet identifiers PID. A first sending means (not shown in FIG. 2) sends for at least one same service identifier PID the corresponding plurality of decomposed broadcast packets TS-packets with a first transport stream protocol as a main service bundle MSB to the access node AN where it can be transmitted to the receivers C1 to C3.

According to a preferred embodiment of the present invention this decomposing of the full service bundle FSB and the sending of that main service bundle MSB is realized by merely removing undesired broadcast packets out of the first transport stream protocol, i.e. MP2T, in accordance with said service identifier PID. In detail, since a main service bundle usually includes a video service and a predominant audio service the evaluation means 2 controls the decomposition means 3 in such a way that only if the service identifier PID refers to the respective video or audio service the corresponding broadcast packets are transmitted, while any other services (i.e. respective broadcast packets) such as further audio services, subtitles, teletext or EPG are removed from the transport stream, i.e. a complete TS-packet according to FIG. 3 is deleted, when detecting a respective service identifier PID. Thus, the main service bundle MSB maintains the transport stream protocol of the incoming full service bundle FSB and transmits only main services such as a video service and one audio service.

Furthermore, there may be provided a second sending means, 41 to 4n which sends for at least one same service identifier the corresponding remaining decomposed broadcast packets with a second transport stream protocol, e.g. real time transport protocol RTP, as a sub service bundle SSB1 through SSBn to the access node AN, wherein the second transport stream protocol RTP comprises synchronization information PCR of the first transport stream protocol MP2T. In detail, the further services such as audio, teletext, subtitle, EPG etc. which are identified by the service identifier PID evaluated in the evaluation means 2 may be provided to the receiver C1 to C3 at the access node AN by a second transport stream protocol such as the real time protocol RTP, which is predominant in conversational and mobile applications.

Figure 4:
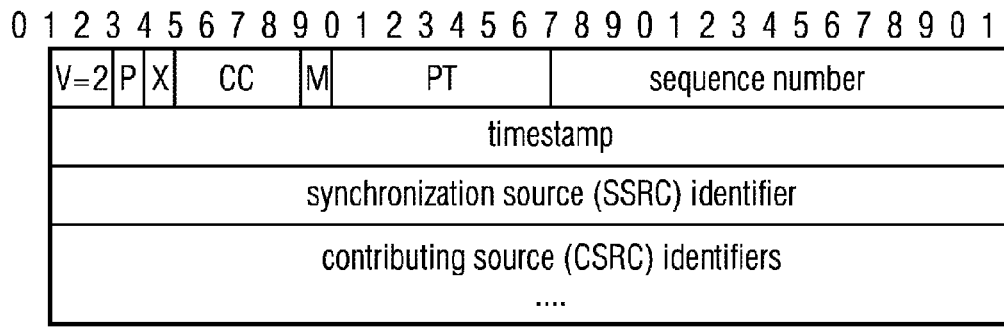
FIG. 4 illustrates the frame structure of the RTP-header according to the real time protocol.

FIG. 4 illustrates a frame structure of the RTP-header of such a real time protocol RTP, which could be used according to the present invention as the second transport stream protocol.

According to FIG. 4 an RTP-header includes a V-field identifying the version of the real time protocol. The version defined by the RTP-header according to FIG. 4 is version 2. A padding bit P is set to indicate that the packet contains one or more additional padding octets at the end which are not part of the payload. An extension bit X indicates, if it is set, that the fixed header is followed by exactly one header extension (not shown) with a predefined format. The CC field defines the CSRC count containing the number of CSRC identifiers that follow the fixed header. The M bit defines a marker. The interpretation of the marker M is defined by a profile. It is intended to allow significant events such as frame boundaries to be marked in the packet stream. The PT field defines the payload type. In detail, this field identifies the format of the RTP payload and determines its interpretation by the application. In the "sequence number" field the sequence number is defined which is incremented by one for each RTP data packet sent and which may be used by the receiver to detect packet loss and to restore packet sequence. The "time stamp" field defines the time stamp reflecting the sampling instant of the first octet in the RTP data packet. The sampling instant must be derived from a clock that increments monotonically and linearly in time to allow synchronization and jitter calculations. The SSRC field identifies the synchronization source and the CSRC field defines the CSRC list identifying the contributing sources for the payload contained in this packet. The number of identifiers is given by the CC field. If there are more than 15 contributing sources, only 15 may be identified. The CSRC identifiers are inserted by mixers, using the SSRC identifiers of contributing sources. With respect to further information concerning this RTP-header it is referred to the well known standard defining the above-mentioned real time protocol RTP.

According to the present invention there are described in the following three alternative embodiments for realizing a subservice bundle SSB by a respective modified real time protocol RTP and a respective second sending means 41 to 4n.

Figure 5:
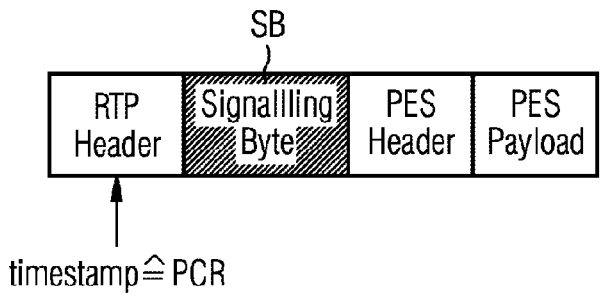
FIGS. 5 to 7 illustrate simplified frame structures of respective transport packets in accordance with modified real time transport protocols of the present invention.

FIG. 5 illustrates a simplified frame structure of a transport packet of a modified RTP according to an embodiment of the present invention. According to FIG. 5 the transport packet (T-packet) of the modified real time transport protocol RTP1 may comprise an RTP-Header and an additional signaling byte SB containing information about whether the RTP-packet contains a start, end, or other parts of a PES-packet (packetized elementary stream). The synchronization information PCR is located in the "time stamp" field of the RTP-Header (see FIG. 4). Thus, a synchronization is enabled between the main service bundle MSB sent in a first transport stream protocol (MP2T) and an additional subservice bundle submitted with a second transport stream protocol (RTP).

According to the present invention in the MP2T transport stream layer the PES elements are brought together into one single multiplexed data stream and are put into subsequent 188 byte packets. According to the first embodiment the generic mapping according to FIG. 5 may be used for the separated PES streams. The signaling byte SB may contain additional information about whether the RTP packet contains the start or end of a PES-packet. Only if the start of a PES-packet is contained, the PES-header will be present.

The reference time, e.g. the program clock reference, PCR corresponding to the first transport stream protocol is provided in the RTP-header as RTP "time stamp". This allows sorting the packets of different RTP-streams at the receiver C1 to C3 and reconstructing the original timing. It should be noted that the RTP-time stamp originally describes the sampling time of the content which is not meaningful for the present invention to reconstruct the original multiplex. Thus, with a minimum modification an improved IP-broadcast scenario with efficient band width usage is provided while the broadcast paradigm is still fulfilled.

Figure 6:
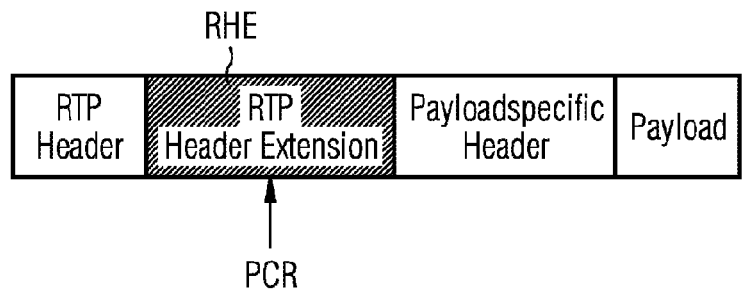

FIG. 6 illustrates a simplified frame structure of a transport packet (T-packet) which is used according to a further embodiment of the present invention. According to this embodiment "real" RTP packets which are standard compliant to RTP-payload formats, e.g. for an AAC, may be used. According to this second embodiment the corresponding timing information, e.g. the program clock reference PCR, is transmitted via an RTP-header-extension RHE to the respective receivers C1 to C3. This has the advantage that the RTP-header extensions RHE may be ignored by other receivers which do only play out RTP-compliant streams, e.g. a legacy device can play the same stream as a set top box STB modified according to the present invention. Thus, in contrast to the first embodiment, the synchronization information PCR would be no longer located in the RTP-header but in the RTP-header-extension RHE of a "real" RTP-packet, wherein the RTP-header-extension RHE may be located at the end of the RTP-Header.

According to the present invention the elementary streams are thus separately packetized as packetized elementary streams PES. Every packet has a PES-header providing information, e.g. about timing (synchronization information). This timing refers always to a master clock, the program clock reference PCR, which is provided in the multiplexing layer, i.e. the transport stream (TS) layer. This allows to synchronize a main service bundle MSB comprising a data stream according to a first transport stream protocol, e.g. MP2T, with at least one further sub service bundle SSB including data streams according to a second transport stream protocol, e.g. RTP.

Figure 7:
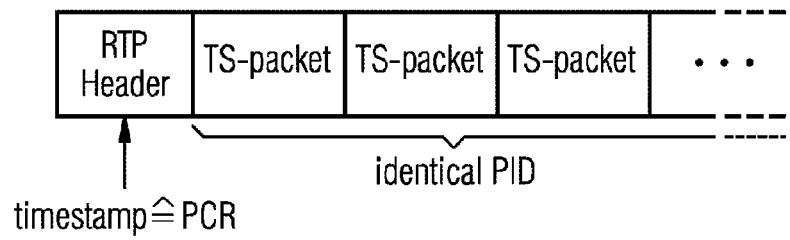

FIG. 7 illustrates a simplified frame structure of a transport packet of a modified RTP according to a further embodiment of the present invention. According to FIG. 7 the transport packet of the second transport stream protocol may include only the RTP-Header and a plurality of broadcast packets, i.e. the transport stream packets (TS-packet) of the MP2T transport stream. Again the synchronization information PCR may be located in the "time stamp" field of the RTP-Header (see FIG. 4). Thus, a synchronization is enabled between the main service bundle MSB sent in a first transport stream protocol (MP2T) and an additional subservice bundle submitted with a second transport stream protocol (RTP). However, since the data are transmitted on a PES-level (packetized elementary stream) but refer to pure broadcast packets having the same service identifier PID a further simplification for the service decomposition can be realized.

According to the present invention there is provided an apparatus for service decomposition in an IP-broadcast system such as a service (de)composition gateway SCOG which allows to decompose rich broadcast service bundles FSB and to map them to different multicast addresses. The result of this mapping process is one main service trunk or main service bundle MSB and separated additional services, i.e. sub service bundles SSB. The main service bundle MSB may contain the basic media service as well as information about timing and media synchronization. More preferably, the main service bundle may contain a main video service and one main audio service. All other services are decomposed to separated streams with preferably only one service. The additional information necessary to synchronize these streams may be provided by the SCOG in a manner as described above. The receivers C1 to C3, i.e. set top boxes STB decide which additional services to use by joining the respective multicast groups. The receivers' choice may be additionally limited by its subscription characteristics typically by the middle ware of the network.

In particular, the sub service bundles may be mapped to different multicast/broadcast channels of a telecommunication network. This further improves an efficient bandwidth usage within e.g. a core network.

To maintain the synchronization between the separated streams, this is realized by the modifications of the transport packets (T-packets) according to FIG. 5 or 6, e.g. by combining two different transport protocols and linking their timing.

Thus, according to the present invention the SCOG receives as an input a regular broadcast MP2T stream and sends as an output a main service bundle again in the same regular broadcast MP2T stream and additional services SSB1 to SSBn, which are delivered with a second transport protocol e.g. RTP. The RTP protocol may be used to achieve synchronization to the MP2T protocol. The advantage of this approach is that a regular MP2T system, which is the basis for most broadcast receivers, can still be used by older legacy receivers which do not support the service decomposition. Full featured receivers can on the other hand exploit the full service or use advanced coding technologies provided in the bundle (e.g. H.264, HDTV, . . . ) thus easing a transition or coexistence of coding technologies. As a result the richness of the service is not limited by the access links bandwidth and can be further enriched without experiencing bandwidth problems. Moreover, it is possible to enrich the bundle with new services which have not been in the original broadcast bundle before, e.g. insertion of forward error correction (as shown at the receiver C3 in FIG. 1).

Figure 8:
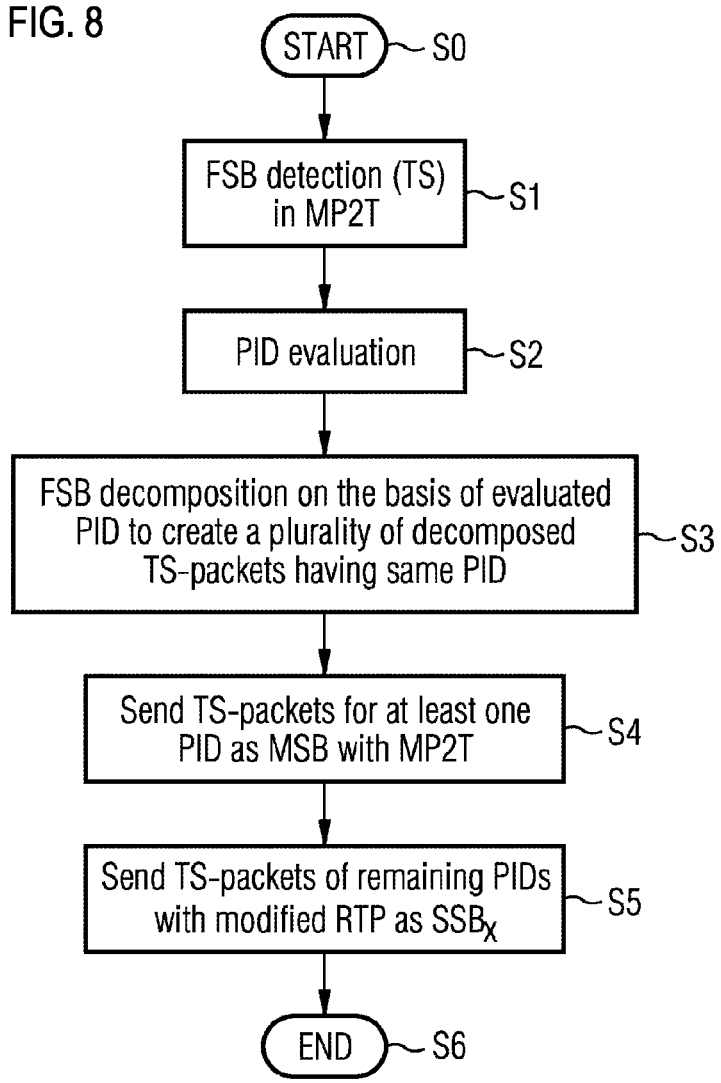
FIG. 8 illustrates a simplified flow chart of a service decomposition method in accordance with the present invention.

FIG. 8 illustrates a simplified flowchart defining a method and a computer program product in accordance with an embodiment of the present invention.

After a start in step S0 a full service bundle FSB is detected within a first transport stream protocol e.g. MP2T comprising a plurality of packetized elementary streams of broadcast services in a step S1. In detail, the transport stream packet (TS-packet) according to FIG. 3 is detected with its complete PES-payload and corresponding service identifiers PID. In a step S2 a PID evaluation is realized, evaluating respective service identifiers PID of said plurality of packetized elementary streams PES, i.e. of said plurality of broadcast packets (TS-packet). In detail, the plurality of broadcast packets are separated on the basis of the respective service identifiers PID. In a step S3 a FSB decomposition is realized on the basis of the evaluated service identifiers PID to create a plurality of decomposed broadcast packets which are included in the full service bundle FSB.

In the step S4 for at least one same service identifier PID the corresponding plurality of decomposed broadcast packets is sent according to the first transport stream protocol, e.g. MP2T, as a main service bundle MSB including the basic media services such as a main video service and one main audio service. The transport stream protocol of the main service bundle MSB is identical to the transport stream protocol of the full service bundle FSB. In a further step S5 for at least one remaining same service identifier the corresponding plurality of decomposed broadcast packets is sent according to a second transport stream protocol, e.g. real time protocol RTP, as a sub service bundle SSB, wherein the second transport stream protocol RTP comprises synchronization information PCR of the first transport stream protocol MP2T, e.g. in its RTP-Header or RTP Header Extension. In detail, the remaining decomposed broadcast packets are sent by respective sub service bundles which may contain only one of the further sub services, i.e. which corresponds to only one same service identifier PID. In addition, new services which have not been in the original full service bundle may be generated and sent to the receiver, e.g. insertion of forward error correction. The flowchart ends in a step S6.

According to a preferred embodiment of the present invention the decomposition of the full service bundle FSB and the sending of the main service bundle is realized by only removing the undesired broadcast packets out of the first transport stream protocol in accordance with the service identifier PID.

In particular, the synchronization information may constitute the program clock reference of the first transport stream protocol, i.e. the MP2T protocol.

As already described with respect to FIGS. 2 to 5, a transport packet (T-packet) of the modified real time transport protocol RTP1 may comprise a signaling byte SB containing information about whether the RTP-packet contains the start or end information of a PES-packet, wherein the synchronization information, e.g. the program clock reference PCR is located in the time stamp of the RTP-header.

According to an alternative embodiment of the present invention (see FIG. 6) a transport packet (T-packet) of the modified real time transport protocol RTP2 comprises an RTP-header-extension RHE, wherein synchronization information PCR is located in the RTP-header-extension.

According to a further alternative embodiment of the present invention (see FIG. 7) the transport packet (T-packet) of the second transport stream protocol may include only the RTP-Header and a plurality of broadcast packets, i.e. the transport stream packets (TS-packet) of the MP2T transport stream.

FIG. 8 illustrates a flowchart of a method and computer program product according to the present invention. It will be understood that each block or step of the flowchart and combinations of blocks in the flowchart, can be implemented by computer program instructions. These computer program instructions may be loaded onto a computer or another programmable apparatus to produce a machine, such that the instructions which are executed on the computer or other programmable apparatus create means for implementing the function specified in the blocks or steps of the flowchart. These computer program instructions may also be stored in a computer-readable memory, e.g. DVD, CD, diskette, that can direct a computer or other programmable apparatus to function in a particular manner. Moreover, these computer program instructions may be downloaded in e.g. a telecommunications network to cause operational steps to be performed on the computer or other programmable apparatus to produce a computer implemented process such that the instructions which execute on the computer or other programmable apparatus provide steps for implementing the functions specified in the blocks or steps of the flowchart.

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart can be implemented by special purpose hardware-based computer systems which perform the specified function or steps or combinations of the special purpose hardware and computer instructions.

Although embodiments of the present invention and their advantages have been described in detail, it should be understood that various changes, substitutions and alterations can be made therein without departing from the spirit and scope of the invention as defined by the appended claims. For example, it will be readily understood by those skilled in the art that many of the features, functions, processes and methods described herein may be varied while remaining within the scope of the present invention. Moreover, the scope of the present application is not intended to be limited to the particular embodiments of the system, process, manufacture, method or steps presently existing or to be developed later, that perform substantially the same function or achieve substantially the same result as the corresponding embodiments described herein may be utilized according to the present invention. Accordingly, the appended claims are intended to include within their scope such systems, processes, methods or steps.

REFERENCE LIST

1 FSB detection means
2 PID evaluation means
3 FSB decomposition means
41 through 4n sending means C1, C2, C3 receiver
AN access node
SCOG service decomposition gateway
BCS broadcast source
MSB main service bundle
SSB sub service bundle
FSB full service bundle
SB signaling byte
PCR synchronization information
RHE RTP-Header extension
PID service identifier
S0-S6 method steps

The invention claimed is:

1. A method for service decomposition in IP-broadcast networks, which comprises the steps of:
    detecting a full service bundle within a first transport stream protocol having a plurality of broadcast packets corresponding to respective broadcast services;
    evaluating respective service identifiers of the plurality of broadcast packets;
    decomposing the full service bundle to create a plurality of decomposed broadcast packets on a basis of the respective service identifiers;
    sending for at least one same service identifier, a corresponding plurality of the decomposed broadcast packets with the first transport stream protocol as a main service bundle; and
    sending for at least one remaining same service identifier, a corresponding plurality of the decomposed broadcast packets with a second transport stream protocol as a sub service bundle, the second transport stream protocol containing synchronization information of the first transport stream protocol, the second transport stream protocol being based on a different protocol family standard than that of the first transport stream protocol.

2. The method according to claim 1, wherein the first transport stream protocol is an MPEG-2 transport stream protocol and a broadcast packet is a transport stream packet.

3. The method according to claim 2, wherein the service identifier is a packet identifier defining a PES-payload of the transport stream packet.

4. The method according to claim 1, wherein the second transport stream protocol is a modified real time transport protocol.

5. The method according to claim 4, wherein a transport packet of the modified real time transport protocol contains an RTP-header, a signaling byte containing information about whether the transport packet contains a start, end, or other parts of a PES-packet, and a part of the PES-packet, and the synchronization information is located in a time stamp of the RTP-header.

6. The method according to claim 4, wherein a transport packet of the modified real time transport protocol contains an RTP-header extension, and the synchronization information is disposed in the RTP-header extension.

7. The method according to claim 4, wherein a transport packet of the modified real time transport protocol contains only an RTP-header and a plurality of broadcast packets corresponding to the same service identifier, and the synchronization information is disposed in a time stamp of the RTP-header.

8. The method according to claim 1, wherein the decomposing of the full service bundle and the sending of the main service bundle is realized by removing undesired broadcast packets out of the first transport stream protocol in accordance with a service identifier.

9. The method according to claim 1, wherein the synchronization information is a program clock reference of the first transport stream protocol.

10. The method according to claim 1, wherein the main service bundle contains a video service and an audio service.

11. The method according to claim 1, wherein the sub service bundle contains only one of a further audio service, a teletext service, a subtitle service, and an EPG service.

12. The method according to claim 1, which further comprises mapping the sub service bundle to different multicast/broadcast channels of a telecommunication network.

13. An apparatus for a service decomposition in IP-broadcast networks, the apparatus comprising:
    detection means for detecting a full service bundle within a first transport stream protocol containing a plurality of broadcast packets corresponding to respective broadcast services;
    evaluation means for evaluating respective service identifiers of the plurality of broadcast packets;
    decomposition means for decomposing the full service bundle to create a plurality of decomposed broadcast packets on a basis of the service identifiers;
    first sending means for sending for at least one same service identifier a corresponding plurality of the decomposed broadcast packets with the first transport stream protocol as a main service bundle; and
    second sending means for sending for at least one remaining same service identifier corresponding decomposed broadcast packets with a second transport stream protocol as a sub service bundle, the second transport stream protocol having synchronization information of the first transport stream protocol, the second transport stream protocol being based on a different protocol family standard than that of the first transport stream protocol.

14. The apparatus according to claim 13, wherein said first sending means uses a MPEG-2 transport stream protocol as the first transport stream protocol and the broadcast packet is a transport stream packet.

15. The apparatus according to claim 14, wherein the service identifier is a packet identifier defining the PES-payload of the transport stream packet.

16. The apparatus according to claim 13, wherein said second sending means uses a modified real time transport protocol as the second transport stream protocol.

17. The apparatus according to claim 16, wherein a transport packet of the modified real time transport protocol contains an RTP-header, a signaling byte containing information about whether the transport packet contains a start, an end, or other parts of a PES-packet, and a part of the PES-packet, the synchronization information is disposed in a time stamp of the RTP-header.

18. The apparatus according to claim 16, wherein a transport packet of the modified real time transport protocol contains an RTP-header-extension, and the synchronization information is disposed in the RTP-header-extension.

19. The apparatus according to claim 16, wherein a transport packet of the modified real time transport protocol contains only an RTP-header and the plurality of broadcast packets corresponding to the same service identifier, and the synchronization information is disposed in a time stamp of the RTP-header.

20. The apparatus according to claim 13, wherein said decomposition means and said first sending means are realized by means for removing undesired broadcast packets out of the first transport stream protocol in accordance with a service identifier.

21. The apparatus according to claim 13, wherein the synchronization information is a program clock reference of the first transport stream protocol.

22. The apparatus according to claim 13, wherein the main service bundle contains a video service and an audio service.

23. The apparatus according to claim 13, wherein the sub service bundle contains only one of a further audio service, a teletext service, a subtitle service, and an EPG service.

24. The apparatus according to claim 13, wherein the sub service bundle is mapped to different multicast/broadcast channels of a telecommunication network.

25. A non-transitory computer-readable medium having computer-executable instructions for performing a method comprising:

detecting a full service bundle within a first transport stream protocol having a plurality of broadcast packets corresponding to respective broadcast services;

evaluating respective service identifiers of the plurality of broadcast packets;

decomposing the full service bundle to create a plurality of decomposed broadcast packets on a basis of the respective service identifiers;

sending for at least one same service identifier a corresponding plurality of the decomposed broadcast packets with the first transport stream protocol as a main service bundle; and sending for at least one remaining same service identifier, a corresponding plurality of the decomposed broadcast packets with a second transport stream protocol as a sub service bundle, the second transport stream protocol containing synchronization information of the first transport stream protocol, the second transport stream protocol being based on a different protocol family standard than that of the first transport stream protocol.

* * * * *